Nov. 3, 1931.  J. V. PUGH  1,830,444
VEHICLE WHEEL
Original Filed Nov. 22, 1926
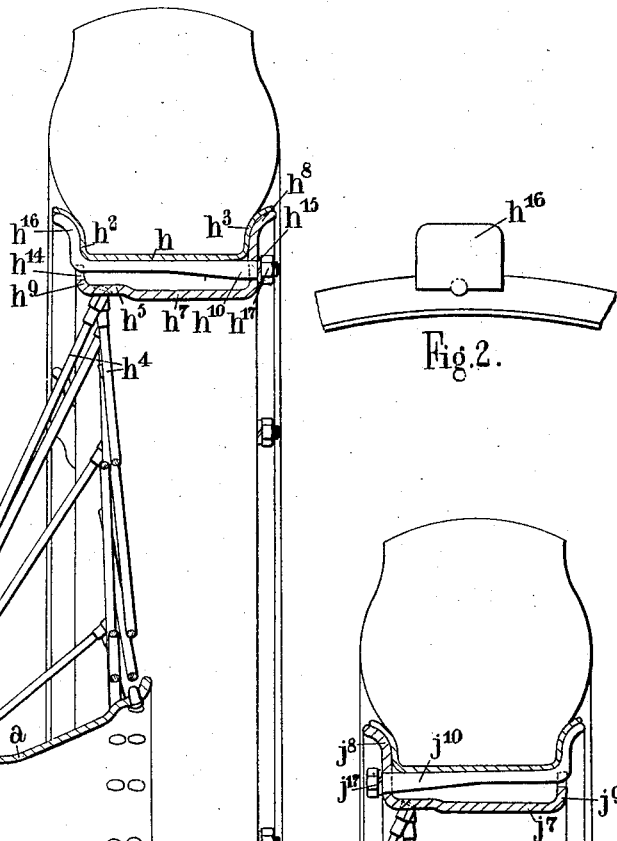
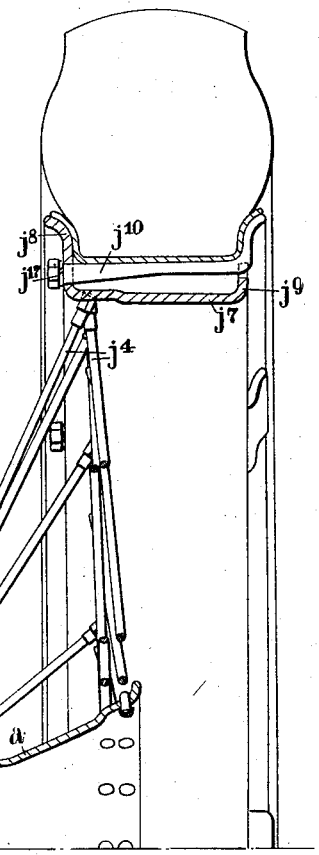
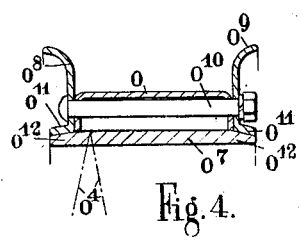
J. V. Pugh
INVENTOR
By: Marks & Clerk
ATTYS Patented Nov. 3, 1931

1,830,444

UNITED STATES PATENT OFFICE

JOHN VERNON PUGH, OF COVENTRY, ENGLAND, ASSIGNOR TO RUDGE-WHITWORTH, LIMITED, OF COVENTRY, ENGLAND

VEHICLE WHEEL

Original application filed November 22, 1926, Serial No. 150,093, and in Great Britain November 30, 1925. Divided and this application filed December 19, 1927. Serial No. 241,213.

This invention relates to vehicle wheels of the type in which a detachable rim for carrying a tyre is mounted upon the remainder of the wheel structure.

The exacting requirements of modern motor vehicle traffic render the provision of ample braking facilities of the greatest importance and not only are large diameter and wide brake drums becoming necessary but the practice of fitting brakes to more than two of the wheels of a vehicle is increasing.

According to the invention a vehicle wheel consists in a brake drum structure supported by tension spokes in a manner capable of resisting the stresses caused by the weight of the vehicle and the torsional and side forces while a readily detachable tyre-carrying rim or felloe is attached solely to said brake drum structure.

Figure 1 shows in transverse section a friction surface member or brake ring supported by the spokes from the hub and adapted to carry the tyre-supporting member or rim which is slid sideways thereon from the outer side and retained by bolts or the like;

Figure 2 is a fragmental side view showing a leaf-headed bolt for securing the tyre rim;

Figure 3 is a similar view to Figure 1 but with the tyre rim detachable on the other side;

Figure 4 shows a built-up section in which the friction surface member or ring also contributes to supporting the contact surfaces or rim for the tyre.

In carrying the invention into effect in one convenient form a brake drum ring $h^7$ or $j^7$ is formed from channel section material having a flat base and sides standing at right angles thereto.

The interior cylindrical surface of the base $h^7$ or $j^7$ forms the friction surface of the brake drum and the ring is connected to a hub or any equivalent member by means of two sets of spokes $h^4$ or $j^4$ penetrating the base of the ring closely adjacent to the edge which is remote from the vehicle and joining the hub or its equivalent closely adjacent to the ends thereof.

The set of spokes adjacent to the vehicle is disposed to correspond with the surface of a very blunt or flat cone with the apex directed towards the vehicle and the spokes in this set will be highly stressed and capable of supporting the weight of the vehicle and also of transmitting all the forces due to driving and braking. The roots of these spokes are positioned closely adjacent to the inner end of the hub.

The other set of spokes which is farther away from the vehicle is disposed adjacent a cone surface of a smaller contained angle and with its apex directed away from the vehicle. These spokes are less highly stressed and are arranged mainly to withstand side stresses to which the tyre or rim of the wheel may be subjected. These spokes are suitably connected to the outer end of the hub.

Figures 1 and 2 illustrate the case of a U-section tyre rim of the kind which may be split and contracted to change the tyre and in this construction a brake ring $h^7$ is employed which is of sufficient strength to form the support or seating for the tyre rim $h$ and the attachment means for the spokes $h^4$. The brake ring $h^7$ is made of a slightly greater width than the narrower bottom portion from the flange $h^2$ to the flange $h^3$ of the tyre rim and is cylindrical throughout its width. It may if desired be set out as at $h^5$ upon the side remote from the vehicle to form the seating ring for the nipple heads of the spokes $h^4$.

A narrow out-turned flange $h^9$ is provided at this end of the rim the outer edge of which registers with the internal diameter of the tyre rim $h$ which is slid thereon and seats immediately adjacent its outer flange $h^2$. The inner edge of the brake ring is provided with a wider out-turned flange $h^8$ which projects over the inner flange $h^3$ of the tyre rim $h$ and is rounded in a curve complementary thereto.

The tyre rim section $h$ and the brake ring $h^7$ are retained in connection with one another by a series of dogs or leaf-headed bolts $h^{10}$ which are passed through notches $h^{14}$ in the narrow flange $h^9$ of the brake ring and holes $h^{15}$ in the wider flange $h^8$ thereof. The leaf heads $h^{16}$ of the bolts are made complementary to the outer surface of the outside flange $h^2$ of the tyre rim and are held tightly against the same by nuts $h^{17}$ which are screwed upon the other ends of the bolts $h^{10}$ and abut against the side of the wider flange $h^8$ of the brake ring which is adjacent to the vehicle.

An alternative to the foregoing construction is shown in Figure 3 and in this case the wider flange $j^8$ of the brake ring is positioned adjacent to the spoking $j^4$ on the side which is remote from the vehicle and the narrower flange $j^9$ is provided upon the other side. The leaf-headed bolts $j^{10}$ are the same as before but are put through from the opposite side so that the leaf heads $j^{16}$ are upon the side adjacent to the vehicle and the nuts $j^{17}$ upon the side remote therefrom.

In these cases where the bolts and dogs are combined and the whole structure lightened and simplified by the leaf heads the tyre changing can only be done with the wheel off the car but dogs may be used in place of the leaf heads $h^{16}$ and the bolts be disposed with the nuts accessible from the outer side of the wheel for tyre changing without taking the wheel off. The trough-shaped part $h^7$ or $j^7$ to which the spokes are fixed acts as the brake band.

There is a flange on both sides of the rim and it is cut away to permit the circular part of the bolt passing through and to permit the flattened part of the dog or end of the bolt to be seated thereon.

A brake ring $o^7$ may, as shown in Figure 4, be provided with a chamfered or coned seating $o^{12}$ upon both its edges and separate flanges $o^8$ and $o^9$ be provided to fit thereon, such flanges being provided if desired with outwardly turned ribs $o^{11}$ around their inner edges to increase the width of the seating upon the brake ring. A tyre-supporting rim $o$ is provided as in the previous construction and the whole may be attached together by separate bolts upon each side or by bolts $o^{10}$ going right through the rim as may be most convenient. In this case the spokes $o^4$ pass through the plain brake ring $o^7$ adjacent to the side $o^8$ which is fartherest from the vehicle.

In the last-described construction different metals, such as duralumin, may be used for the two detachable flanges while the brake ring is formed of steel or other suitable material.

In the various constructions described the thicknesses of the material will be apportioned to the particular duty which is to be performed and where the material acts as a brake drum it is possible that its thickness should not be less than about ⅛ of an inch. A rim which serves merely as a tyre seat and has neither brake drum nor spoke seating functions to perform might be reduced to about .04 of an inch in thickness.

Having now described my invention, what I claim as new and desire to secure by Letters Patent is:—

1. In combination in a vehicle wheel, a hub, a thick section worked steel separate ring disposed concentrically nearer one end of said hub than the other, a wide more or less cylindrical region on said ring, sets of tensioned wire spokes extending from axially separated zones on said hub to near one edge of said ring to leave the greater part of the wide region available as a brake drum surface, and a demountable thinner section worked steel structure for mounting a pneumatic tyre wholly supported on said ring.

2. In combination in a vehicle wheel, a hub, a thick section worked steel separate ring disposed concentrically nearer one end of said hub than the other, a wide brake drum surface region on said ring, sets of tensioned wire spokes extending from axially separated zones on said hub to a region near an edge of said ring which is remote from and of larger diameter than said brake drum surface, outwardly-turned flanges at each edge of said ring, and a thinner worked steel trough-shaped section demountable ring engaging said flanges for mounting a pneumatic tyre on said ring.

In testimony whereof I have signed my name to this specification.

JOHN VERNON PUGH.